United States Patent [19]

Makowski

[11] 4,162,879
[45] Jul. 31, 1979

[54] INTERCHANGEABLE ROTATING TABLES FOR INJECTION BLOW MOLDING MACHINES

[75] Inventor: Alexander G. Makowski, Bound Brook, N.J.

[73] Assignee: Rainville Company, Inc., Middlesex, N.J.

[21] Appl. No.: 828,186

[22] Filed: Aug. 26, 1977

[51] Int. Cl.² ............................................. B29D 23/03
[52] U.S. Cl. .................................. 425/183; 425/533; 425/540
[58] Field of Search ............... 425/182, 183, 533, 522, 425/538, 539, 540; 264/97

[56] References Cited

U.S. PATENT DOCUMENTS

| | | | |
|---|---|---|---|
| 3,100,913 | 8/1963 | De Matteo | 425/533 X |
| 3,584,337 | 6/1971 | Aoki | 425/533 X |
| 3,893,793 | 7/1975 | Farrell | 425/538 |
| 4,072,456 | 2/1978 | Appell et al. | 425/183 |

Primary Examiner—John McQuade
Attorney, Agent, or Firm—Roy Hopgood; John Calimafde; Chas. W. Neill

[57] ABSTRACT

The injection blow molding machine of this invention has a small indexing plate to which heads of different size can be connected. A small head can be used for long core rods when making parts of long length. Larger heads are connected to the indexing plate for accommodating more and shorter core rods. The same machine can, therefore, be used for making different parts of a variety not possible on standard injection blow molding machines. Special features of construction prevent the blowing air from exerting an upward pressure on the head that carries the core rods; and an improved cam mechanism operates air valves without exerting side thrust against the head. An indexing alarm prevents operation of the machine when not properly indexed at the operational stations.

10 Claims, 9 Drawing Figures

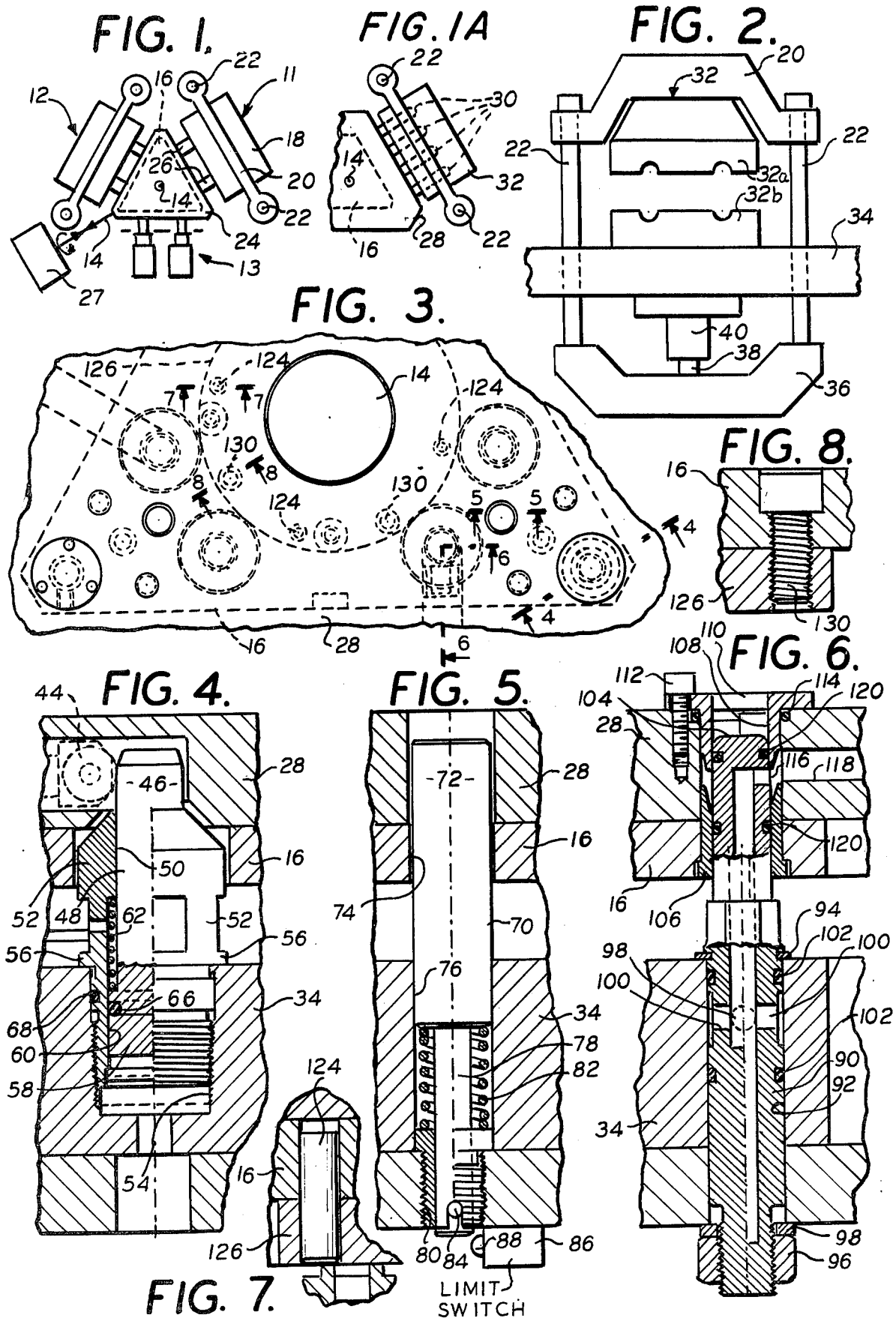

INTERCHANGEABLE ROTATING TABLES FOR INJECTION BLOW MOLDING MACHINES

BACKGROUND AND SUMMARY OF THE INVENTION

This invention relates to the type of blow molding machine in which an indexing plate rotates intermittently to move core rods carried by an attached head to an injection station where molten parisons are applied to core rods. The next movement of the head carries the rods to a blowing station at which the parisons on the core rods are blown to the shape of the cavities of the mold at the blowing station. The last station has cooled articles stripped from the core rods.

While three stations are basic for blow molding machines, some machines have additional intermediate stations for special operation such as temperature control, coating and other operations. The invention is an improvement that can be used for machines having any number of stations; but it will be described as applied to a basic three-station machine.

The head that is carried by the indexing plate is a polygon, in plan view, and face blocks on sides of the polygon hold core rods projecting at right angles to the sides of the face block in directions for projecting into molds at the injection and blowing stations. Molds on the machine have to be changed for every different product and size of product; and usually core rods have to be changed also. When the molds open, the indexing plate and the head connected with it rise and lift the core rods clear of the lower, fixed mold section, and the indexing plate and head turn far enough to move the core rods to the next station.

While longer molds and longer core rods can be used to make longer parts, every conventional machine has a limit on the length of core rods it can use without having the core rods strike some fixed part of the machine when the indexing plate turns angularly to move the core rods to the next station. This invention makes possible a greater range of sizes of the parts that can be made on the machine so that one machine can obtain a variety that would formerly require two or more machines of different size.

The basic concept of this invention is to provide a small size of indexing plate so that a small head on the indexing plate can support core rods which are set back nearer to the center of rotation of the indexing head, and this permits the use of longer rods and larger molds without having the core rods strike the fixed structure of the machine when the indexing head turns. For smaller articles, larger heads are placed on the indexing plate, and the larger heads have longer side faces and can accommodate more core rods, though the core rods have to be shorter in order to clear fixed parts of the machine when the indexing plate rotates the head to the next operational station. Air passages, valve-operating mechanisms and other controls of the different size heads are constructed so that they register with corresponding parts of the basic head so that no elaborate circuit changes are required.

The invention also includes some improvements in the air connections, indexing registration mechanism, and cams for operating air valves for the blowing operation.

Other objects, features, and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic top plan view of a blow molding machine equipped with the smallest head of this invention;

FIG. 1a is a diagrammatic view similar to FIG. 1 but with some parts omitted and other parts broken away, and illustrating the way in which the use of a larger head permits the use of a greater number of core rods but requires shorter rods to avoid striking permanent structure of the machine;

FIG. 2 is an enlarged side view of one of the molds shown in FIG. 1 and showing also the fixed table of the machine and the mechanism for opening and closing the mold;

FIG. 3 is a greatly enlarged, fragmentary view of the head shown in FIG. 1; and

FIGS. 4–8 are greatly enlarged sectional views taken on the lines 4—4 through 8—8 of FIG. 3.

DESCRIPTION OF PREFERRED EMBODIMENT

The basic blow molding machine shown diagrammatically in FIG. 1 includes an injection station 11, a blowing station 12 and a stripper station 13. These operational stations 11–13 are located at equiangular spacing around a center post 14 which supports an indexing plate 16 secured to the center post 14 by an integral connection so that the post 14 and indexing plate 16 move together during intermittent movement axially as the post 14 moves up and down and angularly as the post 14 moves intermittently about its axis.

An injection mold 18 is located at the injection station 11, and the upper section of the mold 18 is attached to a top frame 20 secured to connecting rods 22 that move up and down, as will be explained in connection with FIG. 2.

A head 24 is secured to the indexing plate 16 by detachable fastening means, which will be explained in connection with later figures. This head 24 can be replaced by other heads of similar shape but larger size. Core rods 26 are connected to the head 24 and extend into the injection mold 18. Similar core rods extend into the corresponding mold at the blowing station 12. Because of the fact that the head 24 is of small size, its side faces, from which the core rods extend, are closer to the axis of rotation of the center post 14 and longer core rods can be used, without striking permanent parts of the machine's structure, such as the connecting rods 22, when the table turns to move the core rods from one operational station to the next. Automatic mechanism for intermittently moving the post 14 up and down and angularly is indicated diagrammatically and designated by the reference character 27. This and other structure shown in FIG. 1 is well understood in the injection molding machine art and need not be further explained.

FIG. 1a shows a larger head 28 secured to the indexing plate 16. Because of the larger size of the head 28, each of the sides of the head 28 is longer than in the case of the head 24, and more core rods can be used, such core rods being indicated by the reference character 30. A four-cavity mold 32 is used in FIG. 1a in place of the two-cavity mold 18 of FIG. 1. The upper section of the mold 32 is connected with the top frame 20 and operated by vertical movement of the connecting rods 22. The head 28 can move angularly about the axis of the post 14, without having the core rods 30 strike against the structure 22 because the core rods 30 are shorter than the core rods 26 of FIG. 1. It will be apparent that the longer core rods 26 of FIG. 1 could not be used with the head 28 of FIG. 1a.

FIG. 2 shows a fixed table 34 of the molding machine. The connecting rods 22 slide in bearings in the fixed table 34; and the connecting rods 22 are connected at their lower ends with a lower frame 36 which is moved up and down by a piston rod 38 of a cylinder and piston, hydraulic motor 40. This motor 40 is supported from the fixed table 34 of the molding machine.

In FIG. 2, the mold 32 is shown in open position. It has an upper mold section 32a and a lower mold section 32b. The section 32b is preferably secured to the table 34 by detachable fastening means which permit the substitution of different molds in place of the mold 32. Fastening means for connecting the sections 32a and 32b with the upper frame 20 and fixed table 34 are not shown, since this is conventional structure.

FIG. 3 shows the indexing plate 16 and portions of the head 28.

FIG. 4 is a sectional view, greatly enlarged, on the section line 4—4 of FIG. 3 and shows the trigger bar actuating mechanism for opening the air valves in the head when air is to be supplied to the core rods at the blowing station. The head 28 is secured to the indexing plate 16. The trigger bar actuating mechanism for opening the valves includes a cam follower 44 which is of conventional construction. Usually such a cam follower is operated by a cam which exerts a counter-thrust against a portion of the head. The novel construction shown in FIG. 4 includes a frusto-conical cam 46 at the upper end of a rod 48 which slides in a long bearing 50 in a rigid housing 52. This housing 52 is threaded into a socket 54 in the fixed table 34 of the molding machine. The housing 52 is screwed down until a flange 56 of the housing contacts with a top surface of the fixed table 34 of the injection molding machine.

A piston 58 at the lower end of the cam structure 48 slides up and down in a cylinder 60 in the lower part of the housing 52. A spring 62 urges the piston 58 downward so as to pull the cam 46 downward so that the cam follower 44 can move toward the right in FIG. 4.

When working fluid is supplied to the cylinder 60 below the piston 58, the cam 46 is moved upward to displace the cam follower 44 toward the left to operate the trigger bar for opening the air valve in the head 28. Such air valves are of conventional construction and no illustration of it is necessary for a complete understanding of this invention.

Seals 66 and 68 are provided to prevent possible leakage of working fluid upward around the outside of the housing 52 and the piston 58.

The novel structure of the cam-operating mechanism shown in FIG. 4 is that the cam 46 has no contact with the head 28; and the housing 52 has no contact with either the head 28 or the indexing plate 16. The housing 52 is rigidly connected with the fixed table 34 of the machine, so that any counter-thrust of the cam follower 44 against the cam 46 is taken by the rigid structure of the machine table 34.

FIG. 5 is a greatly enlarged sectional view on the line 5—5 of FIG. 3. It shows a dowel 70 which has an upper, full diameter portion 72 that extends through an opening 74 in the indexing plate 16, and through a corresponding opening in the head 28. The full diameter portion of the dowel 70 slides in a bearing 76 in the fixed table 34 of the machine.

A reduced diameter portion 78 of the dowel 70 slides in a lower bearing formed by a bushing 80 in a lower part of the fixed frame 34.

A coil spring 82 urges the dowel 70 upward above the top surface of the indexing plate 16, and a pin 84 extending through the lower part 78 of the dowel limits upward movement of the dowel 70.

After the indexing plate 16 has moved angularly to bring the core rods to the next operational station, the indexing plate 16 moves downward. If the opening 74 through the indexing plate 16 is not in accurate alignment with the dowel 70, the lowering of the indexing head will push the dowel 70 downward so that the lower end of the dowel actuates a limit switch 86 by displacing a button 88 of the limit switch, this button extending into the path of the lower end of the dowel 70. The limit switch 86 controls a circuit which may sound an alarm or actuate an automatic stop of the blow molding machine.

FIG. 6 is an enlarged view taken on the line 6—6 of FIG. 3, and it shows a novel construction for supplying air under pressure to passages in the head 28 without exerting any upward pressure on the head 28 or the indexing plate 16.

A passage 92 extends upward through the fixed table 34 of the machine, and there is a duct 90 inserted through this opening 92 and extending upward into the indexing plate 16 and head 28 when the indexing plate and head are in their lowered position. The duct 90 is secured in a rigid fixed position with respect to the fixed table 34 by a split ring 94 extending from a groove in the outside surface of the duct 90 at the top surface of the fixed table 34. The lower end of the duct 90 is closed and is held in place by a nut 96 screwed over threads on the lower end of the duct 90 with a washer 98 clamped against the bottom of the table assembly 34.

Air is supplied to the interior of the duct 90 through a passage 98 in the table of the machine and through openings 100 in the wall of the duct. There are seals 102 above and below the openings 98 and 100 so that no air can escape from the table 34 along the outside of the duct 90.

The upper part of the duct 90 is closed and has a rounded corner 104 which enters into a bushing 106 having a rounded entrance as the indexing plate 16 and the head 24 move downward to their lowermost positions. With the indexing plate in such position, the upper end of the duct 90 extends through the bushing 106 and into a cylindrical portion 108 of a cap 110 attached to the head 28 by screws 112 and sealed against escape of air by a sealing ring 114.

There is an opening 116 through the side of the duct 90 which is in substantial alignment with an air passage 118 for supplying air to the valves which regulate the air flow to the core rods.

The upper portion of the duct 90 has sealing rings 120 both above and below the passage 116 so that air flowing upward through the duct 90 can pass into the passage 118 but cannot escape along the outside surface of the duct 90 within the opening into which the duct extends in the indexing plate 16 and head 28.

Attention is called to the fact that this construction in FIG. 6 does not exert any upward air pressure on the indexing plate 16 or the head 28. Air pressure in the passage 118 is balanced; and if there is any upward pressure against the closed upper end of the duct 90, it is exerted against the nut 96 at the bottom of the fixed table structure of the machine.

FIG. 7 is an enlarged view showing a section on the line 7—7 of FIG. 3 where a dowel 124 controls the exact positioning of the indexing plate 16 with respect to a flange 126 integrally connected with the center post 14. As shown in FIG. 3, there are dowels 124 at angularly spaced locations around the flange 126. The dowels 124 make the flange 126 and the index plate 16 an integral structure as far as their angular relation is concerned in a plane normal to the axis of the center post. Additional means are provided for holding the flange 126 and the index plate 16 firmly clamped together in the direction of the axis of the center post. This structure is shown in FIG. 8.

The indexing plate 16 is secured to the flange 126 by a number of screws 130. In order to prevent the screws 130 from interfering with a flat surface for mounting different heads on the indexing plate 16, the screws 130 are countersunk and preferably provided with hexagonal sockets at their upper ends for obtaining tight clamping action from the screws.

The heads of different size are clamped in position on the indexing plate 16 by screw connections which are similar to those shown in FIG. 8 but no countersinking is required, since no other structure is added above the different heads which hold the core rods. The screws for securing the head 28 to the indexing plate 16 are shown in FIG 3 and designated by the reference characters 134.

The preferred embodiment of the invention has been illustrated and described, but changes and modifications can be made and some features can be used in different combinations without departing from the invention as defined in the claims.

What is claimed is:

1. An injection blow molding machine including in combination a center post means intermittently movable about and along its axis, an indexing plate means secured to the center post means for movement therewith during successive intermittent movement of the post means both angularly about said axis and axially between raised and lowered positions, a relatively fixed table of the machine at a lower level than the indexing plate means and toward and from which the indexing plate means moves when the center post means moves axially, machine means connected to the table that aligns with openings through the indexing plate means when the indexing plate means is at an angular position at which it moves vertically, a plurality of head means of different size from one another and constructed to support core rods of different size from those on the other head means, all of the head means having openings in bottom faces therefor for register with the openings in the indexing plate means, dowels and sockets in each head means and the indexing plate means in positions to orient any one of the head means with the indexing plate means to register the openings in each head means with corresponding openings in the indexing plate means when any one of the head means is attached to the indexing plate means, and injection, blowing and stripper operational station means at angularly spaced locations around the post means and the indexing plate means and the head means carried by the indexing plate means.

2. The injection blow molding machine described in claim 1 characterized by each of the head means being of polygon shape and having faces along the sides of the polygon with core rods projecting from the respective faces of the head means and toward molds at the injection and blowing operational station means, and means for holding the different molds in spaced relation from the polygon sides of the respective head means, depending upon the size of the head means and the length of a core rod carried thereby.

3. The injection blow molding machine described in claim 2 wherein the molds include that moves upward away from the fixed section in order to open the mold, a frame to which the movable section is connected and by which the movable section is operated toward and from the fixed section, connecting rods extending downward from the frame, said rods being at opposite sides of the frame and spaced from the center post means of the machine by a distance greater than the distance from the axis of the center post means to the most remote end of a cavity of a mold confronting a side of the head means at the same station means as the mold.

4. The injection blow molding machine described in claim 1 characterized by an air duct extending upward from the table of the machine and toward the head means for a distance greater than the thickness of the indexing plate means and projecting into a cylindrical opening in a head means, that is carried by the indexing plate means, when the indexing plate means and head means are in their lowered positions and indexed to the angular position corresponding to the blowing operational station means.

5. The injection blow molding machine described in claim 4 characterized by the air duct being closed at its upper end and having a side opening that communicates with an air passage extending through the head means in a direction substantially normal to the axis of the air duct, and seals around the outside of the air duct above and below the side opening.

6. The injection blow molding machine described in claim 4 characterized by the air duct being closed at its upper end and having a side opening that communicates with an air passage extending through the head means, the air duct being slidable in the opening into which it extends in the indexing plate means and the head means, and fastening means preventing axial movement of the air duct with respect to the table of the machine whereby upward pressure by the air in the air duct is exerted against the table of the machine and no upward pressure is exerted against the head means by the air in the duct.

7. The injection blow molding machine described in claim 1 characterized by an indexing safety shaft extending upward from the table of the machine, a bearing in the machine table and in which the safety shaft is slidable axially, a spring urging the shaft upward to a level higher than the bottom of the indexing plate means when the head means and indexing plate means are in their lowered position, means for restraining upward movement of the shaft to keep it within said bearing, an opening in the indexing plate means in position to register with the safety shaft when the indexing plate means and the head means are correctly indexed with respect to an operational station means, and a limit switch in position to be operated by downward movement of an incorrectly indexed plate means and head means into displacing contact with the upper end of the safety shaft.

8. The injection blow molding machine described in claim 1 characterized by a cam within the head means for actuating an air control valve in the head means, the displacement face of the cam exerting a thrust in a direction generally parallel to the top surface of the head means, an actuator for the cam located in the table of the machine and extending upward to the cam with clearance from the head means and indexing plate means, the actuator being an integral and stiff structural unit that transmits side thrust of the cam directly to the table of the machine without touching the head or indexing plate.

9. The injection blow molding machine described in claim 8 characterized by the actuator for the cam comprising a cylinder that is held firmly in the table of the machine, a piston in the cylinder connected with the cam and movable upwardly as a unit with the cam when working fluid is supplied to the cylinder under the piston, the cam being a frusto-conical surface with one side of its sloping surface in contact with a cam follower that operates an air valve in the head means.

10. The injection blow molding machine described in claim 1 characterized by an air duct extending upward from the table of the machine, the air duct extending through the indexing plate means and into the head means and communicating with air passages in the head means which lead to core rods that extend from the face of the head means that is at the blowing operational section means.

* * * * *

UNITED STATES PATENT OFFICE
CERTIFICATE OF CORRECTION

PATENT NO. : 4,162,879
DATED : July 31, 1979
INVENTOR(S) : Alexander G. Makowski It is certified that error appears in the above-identified patent and that said Letters Patent are hereby corrected as shown below:

In claim 3 second line should read as follows:

"... Claim 2 wherein the molds include a fixed section and a movable section ..."

Signed and Sealed this

Twenty-third Day of October 1979

[SEAL]

Attest:

RUTH C. MASON
Attesting Officer

LUTRELLE F. PARKER
Acting Commissioner of Patents and Trademarks